US012749812B2

(12) United States Patent
Toyao

(10) Patent No.: US 12,749,812 B2
(45) **Date of Patent: *Sep. 29, 2026**

(54) MULTI-RESONANT ANTENNA

(71) Applicant: JAPAN AVIATION ELECTRONICS INDUSTRY, LIMITED, Tokyo (JP)

(72) Inventor: Hiroshi Toyao, Tokyo (JP)

(73) Assignee: JAPAN AVIATION ELECTRONICS INDUSTRY, LIMITED, Tokyo (JP)

(*) Notice: Subject to any disclaimer, the term of this patent is extended or adjusted under 35 U.S.C. 154(b) by 85 days.

This patent is subject to a terminal disclaimer.

(21) Appl. No.: 18/820,746

(22) Filed: Aug. 30, 2024

(65) Prior Publication Data

US 2025/0105506 A1 Mar. 27, 2025

(30) Foreign Application Priority Data

Sep. 21, 2023 (JP) ................................ 2023-156342

(51) Int. Cl.
*H01Q 5/10* (2015.01)
*H01Q 5/35* (2015.01)

(52) U.S. Cl.
CPC ................ *H01Q 5/10* (2015.01); *H01Q 5/35* (2015.01)

(58) Field of Classification Search
CPC .......... H01Q 1/243; H01Q 13/10; H01Q 1/38; H01Q 5/371; H01Q 7/00; H01Q 9/42; H01Q 1/48; H01Q 1/2291; H01Q 13/16; H01Q 21/28; H01Q 5/378; H01Q 9/0421; H01Q 9/285; H01Q 9/40; H01Q 1/2225; H01Q 1/24; H01Q 1/36; H01Q 1/521; H01Q 13/106; H01Q 21/29; H01Q 5/357; H01Q 5/385; H01Q 5/48; H01Q 9/16; H01Q 1/12; H01Q 1/2266; H01Q 1/246; H01Q 1/42; H01Q 1/44; H01Q 1/46; H01Q 1/50; H01Q 13/103; H01Q 15/18; H01Q 21/00; H01Q 21/0006; H01Q 21/12; H01Q 21/205; H01Q 21/24; H01Q 21/26; H01Q 21/30; H01Q 3/24; H01Q 3/34; H01Q 3/46; H01Q 5/00; H01Q 5/10; H01Q 5/15; H01Q 5/22; H01Q 5/30; H01Q 5/321;

(Continued)

(56) References Cited

U.S. PATENT DOCUMENTS

| | | | | |
|---|---|---|---|---|
| 9,960,483 | B2 * | 5/2018 | Toyao | H01Q 1/243 |
| 2014/0203993 | A1 | 7/2014 | Toyao | |

(Continued)

FOREIGN PATENT DOCUMENTS

| | | | |
|---|---|---|---|
| JP | 2015185910 | A | 10/2015 |
| JP | 6014071 | B2 | 10/2016 |

(Continued)

OTHER PUBLICATIONS

Extended European Search Report (EESR) dated Jan. 30, 2025, issued in counterpart European Application No. 24196859.3.

*Primary Examiner* — Monica C King
(74) *Attorney, Agent, or Firm* — Holtz, Holtz & Volek PC

(57) ABSTRACT

A multi-resonant antenna comprises a main antenna and an additional radiation element. The main antenna comprises a main portion and a feeding portion. The main portion forms a split ring. The feeding portion extends outward of the main antenna from the main portion. The additional radiation element extends outward of the main antenna directly from the feeding portion.

4 Claims, 4 Drawing Sheets

(58) Field of Classification Search
CPC .......... H01Q 5/328; H01Q 5/35; H01Q 5/364; H01Q 5/392; H01Q 5/40; H01Q 5/50; H01Q 9/04; H01Q 9/0407; H01Q 9/0442; H01Q 9/0485; H01Q 9/065; H01Q 9/145; H01Q 9/26; H01Q 9/28; H01Q 9/30
See application file for complete search history.

(56) References Cited

U.S. PATENT DOCUMENTS

| | | | | |
|---|---|---|---|---|
| 2022/0255226 | A1* | 8/2022 | Wang | H01Q 1/48 |
| 2022/0271429 | A1 | 8/2022 | Kosaka | |

FOREIGN PATENT DOCUMENTS

| | | | |
|---|---|---|---|
| JP | 6020451 | B2 | 11/2016 |
| JP | 2019047183 | A | 3/2019 |

* cited by examiner

MULTI-RESONANT ANTENNA

CROSS REFERENCE TO RELATED APPLICATIONS

This application is based on and claims priority under 35 U.S.C. § 119 to Japanese Patent Application No. JP2023-156342 filed Sep. 21, 2023, the contents of which are incorporated herein in their entirety by reference.

BACKGROUND OF THE INVENTION

This invention relates to a multi-resonant antenna.

JPB 6020451(Patent Document 1) discloses a small and broadband antenna 900. As shown in FIG. 8, the antenna 900 of Patent Document 1 has a split-ring resonator 910 using a split-ring 920 which is an annular conductor with a split portion 922. Specifically, the antenna 900 of Patent Document 1 has a main portion 930 and a feeding portion 940. The main portion 930 forms the split-ring 920. The feeding portion 940 is provided to the main portion 930.

The antenna 900 of Patent Document 1 operates at a resonant frequency of the split-ring resonator 910. In other words, the antenna 900 of Patent Document 1 resonates at only one operating frequency but cannot cope with a broad frequency band.

SUMMARY OF THE INVENTION

It is therefore an object of the present invention to provide an antenna having a structure which can resonate at a plurality of operating frequencies.

One aspect of the present invention provides a multi-resonant antenna comprising a main antenna and an additional radiation element. The main antenna comprises a main portion and a feeding portion. The main portion forms a split ring. The feeding portion extends outward of the main antenna from the main portion. The additional radiation element extends outward of the main antenna directly from the feeding portion.

The multi-resonant antenna of the present invention comprises the additional radiation element in addition to the main antenna. With this structure, the multi-resonant antenna of the present invention can resonate at both of an operating frequency of the main antenna and an operating frequency of the additional radiation element. In other words, the multi-resonant antenna of the present invention has a structure which can resonate at a plurality of operating frequencies.

An appreciation of the objectives of the present invention and a more complete understanding of its structure may be had by studying the following description of the preferred embodiment and by referring to the accompanying drawings.

Figure 1:
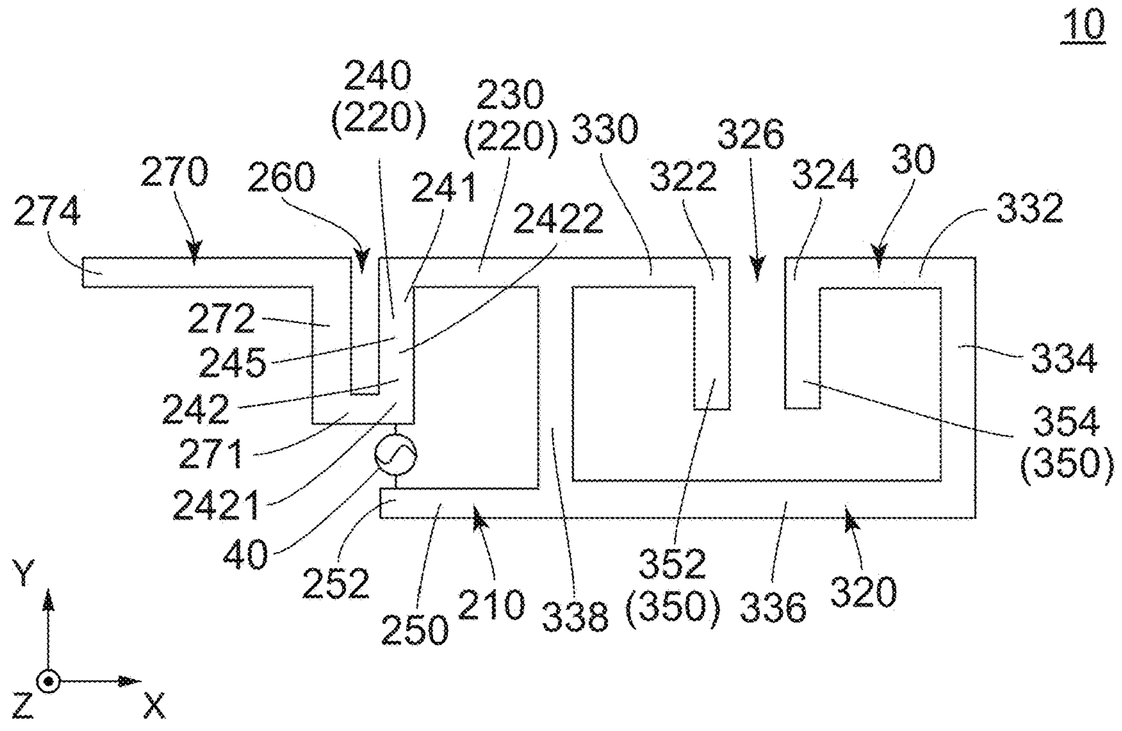
FIG. 1 is a top view showing a multi-resonant antenna according to an embodiment of the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

As shown in FIG. 1, a multi-resonant antenna 10 according to an embodiment of the present invention comprises a main antenna 30 and an additional radiation element 270. There is no ground conductor around the multi-resonant antenna 10 of the present embodiment.

As shown in FIG. 1, the main antenna 30 and the additional radiation element 270 are positioned on a common plane perpendicular to an up-down direction. In the present embodiment, the up-down direction is a Z-direction. Specifically, a positive Z-direction is upward while a negative Z-direction is downward. The multi-resonant antenna 10 is configured so that the main antenna 30 and the additional radiation element 270 are integrally formed with each other. A combination of the main antenna 30 and the additional radiation element 270 is formed of a conductive pattern formed on a substrate (not shown). However, the present invention is not limited thereto. Specifically, the combination of the main antenna 30 and the additional radiation element 270 may be formed of, for example, a metal member which is mounted on a substrate when used. If the combination of the main antenna 30 and the additional radiation element 270 is formed by microfabrication techniques, the combination of the main antenna 30 and the additional radiation element 270, which is formed of the conductive pattern formed on the substrate, has a mechanical strength greater than a mechanical strength of the combination of the main antenna 30 and the additional radiation element 270 which is formed of the metal member mounted on the substrate when used. Accordingly, the combination of the main antenna 30 and the additional radiation element 270 is preferred to be formed of the conductive pattern formed on the substrate.

As shown in FIG. 1, the main antenna 30 comprises a main portion 320 and a feeding portion 210.

As shown in FIG. 1, a shape of the main portion 320 of the present embodiment is an approximately rectangular ring shape long in a lateral direction. However, the present invention is not limited thereto. The shape of the main portion 320 of the present invention may be any one of various ring shapes, such as not only the approximately rectangular ring shape but also an annular shape, an elliptical annular shape and a polygonal annular shape. In the present embodiment, the lateral direction is an X-direction. Specifically, a negative X-direction is also referred to as a first predetermined direction in the present embodiment.

As shown in FIG. 1, the main portion 320 has a first portion 330, a second portion 332, a third portion 334, a fourth portion 336 and a fifth portion 338. Each of the first portion 330 and the second portion 332 extends along the lateral direction. The first portion 330 and the second portion 332 are arranged in the first predetermined direction. The first portion 330 and the second portion 332 are positioned at the same position as each other in a front-rear direction. The fourth portion 336 extends along the lateral direction. The fourth portion 336 are spaced apart from any of the first portion 330 and the second portion 332 in the front-rear direction. The fourth portion 336 is arranged parallel to the first portion 330. The fourth portion 336 is arranged parallel to the second portion 332. Each of the third portion 334 and the fifth portion 338 extends in the front-rear direction. The third portion 334 and the fifth portion 338 are spaced apart from each other in the lateral direction. The third portion 334 and the fifth portion 338 are arranged parallel to each other. In the present embodiment, the front-rear direction is a Y-direction. Specifically, it is assumed that a positive Y-direction is forward while a negative Y-direction is rearward. In the present embodiment, the negative Y-direction is also referred to as a second predetermined direction, and the positive Y-direction is also referred to as a third predetermined direction.

As shown in FIG. 1, the first portion 330 is positioned beyond the second portion 332 in the first predetermined direction. The first portion 330 is positioned beyond the third portion 334 in the first predetermined direction. The fourth portion 336 is positioned beyond the first portion 330 in the second predetermined direction. The fourth portion 336 is positioned beyond the second portion 332 in the second predetermined direction. The fifth portion 338 is positioned beyond the third portion 334 in the first predetermined direction.

As shown in FIG. 1, the first portion 330 of the main portion 320 has a first end portion 322, while the second portion 332 of the main portion 320 has a second end portion 324. The first end portion 322 and the second end portion 324 are spaced apart from each other and face each other. The first end portion 322 and the second end portion 324 form a split portion 326. The split portion 326 extends linearly in the second predetermined direction. The third portion 334 of the main portion 320 couples the second portion 332 and the fourth portion 336 with each other. The fifth portion 338 of the main portion 320 couples the first portion 330 and the fourth portion 336 with each other. The aforementioned configuration enables the main portion 320 to form a split ring with the split portion 326. However, the present invention is not limited thereto. The main portion 320 may have another ring shape, such as an annular shape or an elliptical annular shape, provided that the main portion 320 forms a split ring.

As shown in FIG. 1, the main antenna 30 further comprises a facing portion 350.

As shown in FIG. 1, the facing portion 350 has a first facing portion 352 and a second facing portion 354. The first facing portion 352 extends from the first end portion 322 in the front-rear direction, while the second facing portion 354 extends from the second end portion 324 in the front-rear direction. Specifically, the first facing portion 352 extends linearly from the first end portion 322 in the front-rear direction, while the second facing portion 354 extends linearly from the second end portion 324 in the front-rear direction. Each of the first facing portion 352 and the second facing portion 354 extends inward of the main portion 320. The first facing portion 352 and the second facing portion 354 are arranged apart from each other by a predetermined distance and parallel to each other. However, the present invention is not limited thereto. In the present invention, provided that the first facing portion 352 and the second facing portion 354 form a capacitor with a desired characteristic, their shapes and sizes are not limited particularly.

Referring to FIG. 1, the main portion 320 forms an inductive component of the main antenna 30 because of the shape thereof. The first end portion 322 and the second end portion 324 form a capacitive component of the main antenna 30 together with the first facing portion 352 and the second facing portion 354. With this structure, the main antenna 30 is operable as an LC resonance circuit, or as a first resonance portion. The LC resonance circuit formed by the main antenna 30 is also called as a split ring resonator. Thus, the main antenna 30 forms the first resonance portion.

As shown in FIG. 1, the feeding portion 210 extends outward of the main antenna 30 from the main portion 320. The feeding portion 210 is positioned at a location beyond the main portion 320 in the first predetermined direction, or in the negative X-direction. However, the present invention is not limited thereto. The feeding portion 210 may be arranged at a location other than the location beyond the main portion 320 in the negative X-direction. The feeding portion 210 comprises a first feeding point 2421, a first feeding part 220, a second feeding point 252 and a second feeding part 250.

As shown in FIG. 1, an excitation source 40 is connected to the first feeding point 2421. Specifically, a core wire (not shown) of a coaxial cable (not shown) is connected to the first feeding point 2421.

As shown in FIG. 1, the first feeding part 220 extends from the main portion 320 to the first feeding point 2421. The first feeding part 220 has a first section 230 and a second section 240.

As shown in FIG. 1, the first section 230 extends in the first predetermined direction from the main portion 320. Specifically, the first section 230 extends linearly in the first predetermined direction from the main portion 320. However, the present invention is not limited. The first section 230 may have any shape, provided that the first section 230 extends in the first predetermined direction from the main portion 320. The first section 230 is positioned at a position same as a position of the first portion 330 in the front-rear direction. The first section 230 is positioned in the first predetermined direction beyond the first portion 330.

As shown in FIG. 1, the second section 240 extends from the first section 230 in the second predetermine direction intersecting with the first predetermined direction. Specifically, the second section 240 extends from the first section 230 in the second predetermine direction perpendicular to the first predetermined direction. The second section 240 extends in the second predetermine direction from an end portion of the first section 230 in the first predetermined direction. The first feeding point 2421 is provided at an end portion of the second section 240 in the second predetermined direction. The second section 240 has a linear portion 2422 extending linearly in the second predetermined direction. More specifically, the second section 240 consists only of the linear portion 2422 extending linearly in the second predetermined direction. However, the present invention is not limited. The second section 240 may have any shape, provided that the second section 240 extends in the second predetermined direction from the first section 230.

As shown in FIG. 1, the second section 240 has a first segment 241 and a second segment 242.

As shown in FIG. 1, the first segment 241 extends from the first section 230. Specifically, the first segment 241 extends linearly in the second predetermined direction from the first section 230. The first segment 241 extends linearly in the second predetermined direction from the end portion of the first section 230 in the first predetermined direction.

As shown in FIG. 1, the second segment 242 extends from the first segment 241. Specifically, the second segment 242 extends linearly in the second predetermined direction from the first segment 241. In the second predetermined direction, a middle 245 of the second section 240 is positioned between the first segment 241 and the second segment 242. Specifically, in the second predetermined direction, the middle 245 of the second section 240 is positioned on a boundary between the first segment 241 and the second segment 242. The first feeding point 2421 is provided at an end portion of the second segment 242 in the second predetermined direction.

As shown in FIG. 1, the excitation source 40 is connected to the second feeding point 252. Specifically, an outer conductor (not shown) of the coaxial cable is connected to the second feeding point 252.

As shown in FIG. 1, the second feeding part 250 extends from the main portion 320 to the second feeding point 252. Specifically, the second feeding part 250 extends linearly in the first predetermined direction from the main portion 320 to the second feeding point 252. The second feeding part 250 is positioned at a position same as a position of the fourth portion 336 in the front-rear direction. The second feeding part 250 is positioned in the first predetermined direction beyond the fourth portion 336.

As shown in FIG. 1, the additional radiation element 270 extends outward of the main antenna 30 directly from the feeding portion 210. The additional radiation element 270 extends outward from the feeding portion 210. The additional radiation element 270 extends in the first predetermined direction from the feeding portion 210. As shown in FIG. 1, the additional radiation element 270 extends from the second segment 242 including the first feeding point 2421. Accordingly, the additional radiation element 270 extends from the vicinity of the first feeding point 2421. This facilitates impedance matching of the additional radiation element 270.

As shown in FIG. 1, the additional radiation element 270 has an additional linear portion 272 extending linearly in the second predetermined direction. The linear portion 2422 and the additional linear portion 272 are spaced apart from each other in the lateral direction. The linear portion 2422 and the additional linear portion 272 are parallel to each other. The linear portion 2422 and the additional linear portion 272 form an open slot 260 which is opened at its end. This further facilitates impedance matching of the additional radiation element 270. The open slot 260 is opened at its end portion in the third predetermined direction. The longer a length of the open slot 260 in the second predetermined direction, the easier it is to achieve impedance matching of the additional radiation element 270. Accordingly, the open slot 260 is preferred to have a longer length in the second predetermined direction.

As shown in FIG. 1, the additional radiation element 270 has a base portion 271 and a first extending portion 274. The base portion 271 extends in the first predetermined direction from the second segment 242. Specifically, the base portion 271 extends linearly in the first predetermined direction from the second segment 242. The base portion 271 and the first extending portion 274 are coupled with each other by the additional linear portion 272. The additional linear portion 272 extends in the third predetermined direction from the base portion 271. The first extending portion 274 extends in the first predetermined direction from the additional linear portion 272. Specifically, the first extending portion 274 extends linearly in the first predetermined direction from the additional linear portion 272. The first extending portion 274 has a rectangular shape extending long in the lateral direction. However, the present invention is not limited thereto. Specifically, the shape of the first extending portion 274 is not limited to the rectangular shape, and the first extending portion 274 may have a wide portion at its end portion.

Although the additional radiation element 270 of the present embodiment has the base portion 271, the additional linear portion 272 and the first extending portion 274, the present invention is not limited thereto. The additional radiation element 270 may be configured as follows: the additional radiation element 270 has none of the base portion 271 and the additional linear portion 272; and the additional radiation element 270 consists only of the first extending portion 274 which extends directly from the second segment 242.

The length and shape of the additional radiation element 270 are decided so that the additional radiation element 270 electrically resonates at a desired operating frequency. The desired operating frequency is different from an operating frequency of the main antenna 30.

As understood from FIG. 1, the multi-resonant antenna 10 is configured so that the main antenna 30 is fed from the first feeding point 2421 and the second feeding point 252. The additional radiation element 270 is connected to the feeding portion 210. With this structure, the main antenna 30 operates as the split ring resonator (the LC resonance circuit or the first resonance portion), and the additional radiation element 270 operates as a second resonance portion different from the first resonance portion. The first resonance portion and the second resonance portion have resonance frequencies different from each other. Thus, the multi-resonant antenna 10 of the present embodiment has the structure which can electrically resonate at the two operating frequencies, one of which is the operating frequency of the main antenna 30, or the first resonance portion, and the other of which is the operating frequency of the additional radiation element 270, or the second resonance portion.

Up to this point, the description has been made about the embodiment of the present invention, and the embodiment may be modified as follows.

(First Modification)

Figure 2:
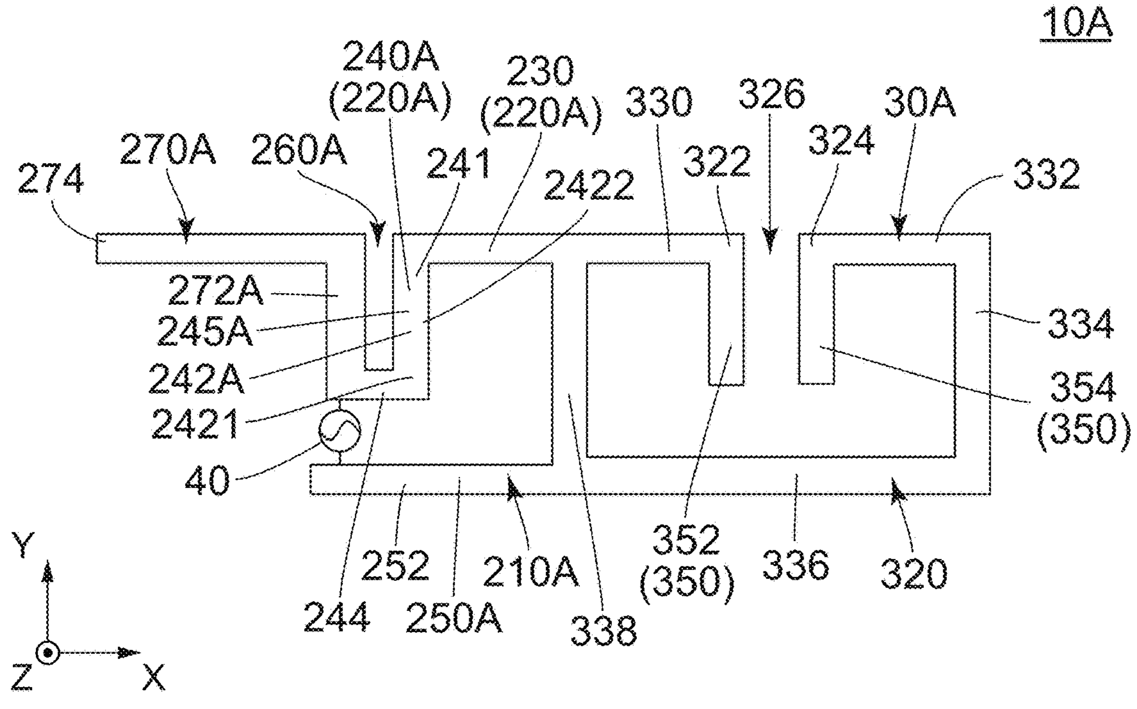
FIG. 2 is a top view showing a first modification of the multi-resonant antenna of FIG. 1.

As shown in FIG. 2, a multi-resonant antenna 10A of a first modification comprises a main antenna 30A and an additional radiation element 270A. There is no ground conductor around the multi-resonant antenna 10A of the present modification.

As shown in FIG. 2, the main antenna 30A and the additional radiation element 270A are positioned on a common plane perpendicular to the up-down direction. The multi-resonant antenna 10A is configured so that the main antenna 30A and the additional radiation element 270A are integrally formed with each other. A combination of the main antenna 30A and the additional radiation element 270A is formed of a conductive pattern formed on a substrate (not shown). However, the present invention is not limited thereto. Specifically, the combination of the main antenna 30A and the additional radiation element 270A may be formed of, for example, a metal member which is mounted on a substrate when used.

As shown in FIG. 2, the main antenna 30A comprises a main portion 320, a facing portion 350 and a feeding portion 210A. The main portion 320 and the facing portion 350 have structures same as those of the main portion 320 and the facing portion 350 of the multi-resonant antenna 10 of the aforementioned embodiment. Accordingly, a detailed explanation thereabout is omitted.

As shown in FIG. 2, the feeding portion 210A extends outward of the main antenna 30A from the main portion 320. The feeding portion 210A is positioned at a location beyond the main portion 320 in the first predetermined direction, or in the negative X-direction. However, the present invention is not limited thereto. The feeding portion 210A may be arranged at a location other than the location beyond the main portion 320 in the negative X-direction. The feeding portion 210A comprises a first feeding point 2421, a first feeding part 220A, a second feeding point 252 and a second feeding part 250A. The first feeding point 2421 and the second feeding point 252 have structures similar to the first feeding point 2421 and the second feeding point 252 of the multi-resonant antenna 10 of the aforementioned embodiment. Accordingly, a detailed explanation thereabout is omitted.

As shown in FIG. 2, the first feeding part 220A extends from the main portion 320 to the first feeding point 2421. The first feeding part 220A has a first section 230 and a second section 240A. The first section 230 have a structure same as that of the first section 230 of the multi-resonant antenna 10 of the aforementioned embodiment. Accordingly, a detailed explanation thereabout is omitted.

As shown in FIG. 2, the second section 240A extends from the first section 230 in the second predetermine direction intersecting with the first predetermined direction. Specifically, the second section 240A extends from the first section 230 in the second predetermine direction perpendicular to the first predetermined direction. The second section 240A extends in the second predetermine direction from an end portion of the first section 230 in the first predetermined direction. The first feeding point 2421 is provided at an end portion of the second section 240A in the second predetermined direction. The second section 240A has a linear portion 2422 and an extending portion 244. The linear portion 2422 extends linearly in the second predetermined direction. The extending portion 244 extends in the first predetermined direction from the linear portion 2422. Specifically, the extending portion 244 extends linearly in the first predetermined direction from the linear portion 2422.

As shown in FIG. 2, the second section 240A has a first segment 241 and a second segment 242A. The first segment 241 has a structure similar to the first segment 241 of the multi-resonant antenna 10 of the aforementioned embodiment. Accordingly, a detailed explanation thereabout is omitted.

As shown in FIG. 2, the second segment 242A extends from the first segment 241. More specifically, the second segment 242A extends linearly in the second predetermined direction from the first segment 241 and is bent so that it extends linearly in the first predetermined direction. In the second predetermined direction, a middle 245A of the second section 240A is positioned between the first segment 241 and the second segment 242A. Specifically, in the second predetermined direction, the middle 245A of the second section 240A is positioned on a boundary between the first segment 241 and the second segment 242A. The first feeding point 2421 is provided at an end portion of the second segment 242A in the second predetermined direction.

As shown in FIG. 2, the second feeding part 250A extends from the main portion 320 to the second feeding point 252. Specifically, the second feeding part 250A extends linearly in the first predetermined direction from the main portion 320 to the second feeding point 252. The second feeding part 250A is positioned at a position same as a position of a fourth portion 336 in the front-rear direction. The second feeding part 250A is positioned in the first predetermined direction beyond the fourth portion 336.

As shown in FIG. 2, the additional radiation element 270A extends outward of the main antenna 30A directly from the feeding portion 210A. The additional radiation element 270A extends outward from the feeding portion 210A. The additional radiation element 270A extends in the first predetermined direction from the feeding portion 210A.

As shown in FIG. 2, the additional radiation element 270A extends from the second segment 242A including the first feeding point 2421. Accordingly, the additional radiation element 270A extends from the vicinity of the first feeding point 2421. This facilitates impedance matching of the additional radiation element 270A.

As shown in FIG. 2, the additional radiation element 270A has an additional linear portion 272A extending linearly in the second predetermined direction. The additional linear portion 272A extends in the third predetermined direction from the second segment 242A. The linear portion 2422 and the additional linear portion 272A are spaced apart from each other in the lateral direction. The linear portion 2422 and the additional linear portion 272A are parallel to each other. The linear portion 2422 and the additional linear portion 272A form an open slot 260A which is opened at its end. This further facilitates impedance matching of the additional radiation element 270A. The open slot 260A is opened at its end portion in the third predetermined direction.

As shown in FIG. 2, the additional radiation element 270A has a first extending portion 274. Dissimilar to the additional radiation element 270 of the aforementioned embodiment, the additional radiation element 270A has no base portion 271. The first extending portion 274 has a structure same as that of the first extending portion 274 of the multi-resonant antenna 10 of the aforementioned embodiment. Accordingly, a detailed explanation thereabout is omitted.

Although the additional radiation element 270A of the present modification has the additional linear portion 272A and the first extending portion 274, the present invention is not limited thereto. Specifically, the additional radiation element 270A may be configured as follows: the additional radiation element 270A has no additional linear portion 272A; and the additional radiation element 270A consists only of the first extending portion 274 which directly extends from the second segment 242A.

The length and shape of the additional radiation element 270A are decided so that the additional radiation element 270A electrically resonates at a desired operating frequency. The desired operating frequency is different from an operating frequency of the main antenna 30A.

As understood from FIG. 2, the multi-resonant antenna 10A of the present modification also has a structure which can electrically resonate at the two operating frequencies, one of which is the operating frequency of the main antenna 30A, or a first resonance portion, and the other of which is the operating frequency of the additional radiation element 270A, or a second resonance portion.

(Second Modification)

Figure 3:
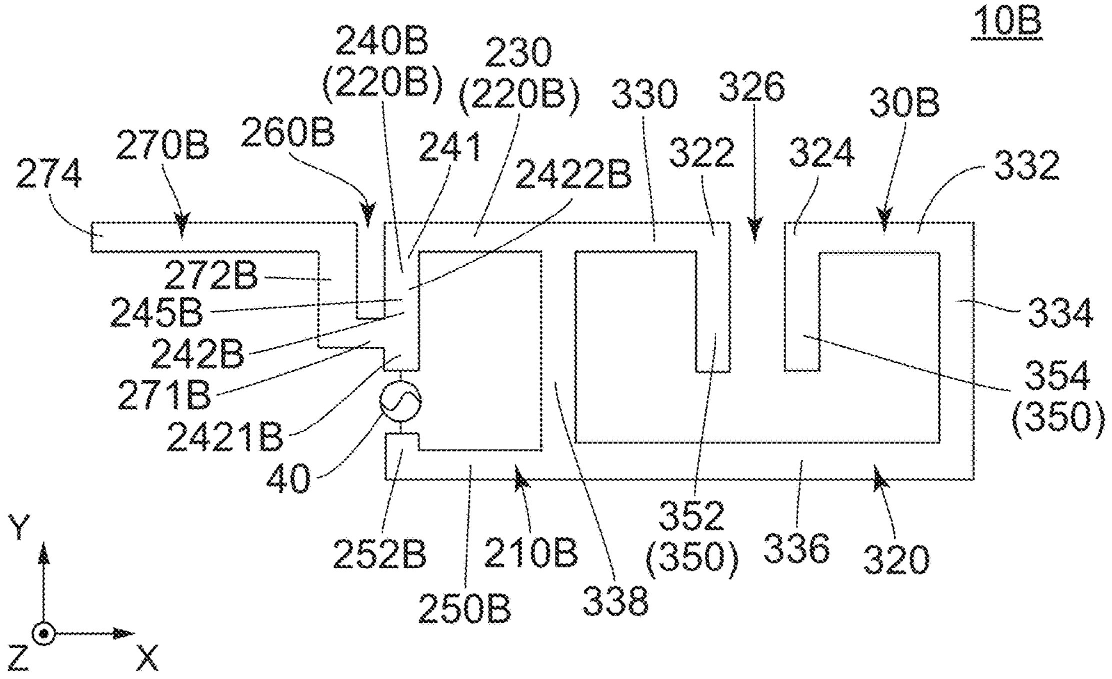
FIG. 3 is a top view showing a second modification of the multi-resonant antenna of FIG. 1.

As shown in FIG. 3, a multi-resonant antenna 10B of a second modification comprises a main antenna 30B and an additional radiation element 270B. There is no ground conductor around the multi-resonant antenna 10B of the present modification.

As shown in FIG. 3, the main antenna 30B and the additional radiation element 270B are positioned on a common plane perpendicular to an up-down direction. The multi-resonant antenna 10B is configured so that the main antenna 30B and the additional radiation element 270B are integrally formed with each other. A combination of the main antenna 30B and the additional radiation element 270B is formed of a conductive pattern formed on a substrate (not shown). However, the present invention is not limited thereto. Specifically, the combination of the main antenna 30B and the additional radiation element 270B may be formed of, for example, a metal member which is mounted on a substrate when used.

As shown in FIG. 3, the main antenna 30B comprises a main portion 320, a facing portion 350 and a feeding portion 210B. The main portion 320 and the facing portion 350 have structures same as those of the main portion 320 and the facing portion 350 of the multi-resonant antenna 10 of the aforementioned embodiment. Accordingly, a detailed explanation thereabout is omitted.

As shown in FIG. 3, the feeding portion 210B extends outward of the main antenna 30B from the main portion 320. The feeding portion 210B is positioned at a location beyond the main portion 320 in the first predetermined direction, or in the negative X-direction. However, the present invention is not limited thereto. The feeding portion 210B may be arranged at a location other than the location beyond the main portion 320 in the negative X-direction. The feeding portion 210B comprises a first feeding point 2421B, a first feeding part 220B, a second feeding point 252B and a second feeding part 250B.

As shown in FIG. 3, an excitation source 40 is connected to the first feeding point 2421B. Specifically, a core wire (not shown) of a coaxial cable (not shown) is connected to the first feeding point 2421B.

As shown in FIG. 3, the first feeding part 220B extends from the main portion 320 to the first feeding point 2421B. The first feeding part 220B has a first section 230 and a second section 240B. The first section 230 has a structure same as that of the first section 230 of the multi-resonant antenna 10 of the aforementioned embodiment. Accordingly, a detailed explanation thereabout is omitted.

As shown in FIG. 3, the second section 240B extends from the first section 230 in the second predetermine direction intersecting with the first predetermined direction. Specifically, the second section 240B extends from the first section 230 in the second predetermine direction perpendicular to the first predetermined direction. The second section 240B extends in the second predetermine direction from an end portion of the first section 230 in the first predetermined direction. The second section 240B has a linear portion 2422B extending linearly in the second predetermined direction. More specifically, the second section 240B consists only of the linear portion 2422B extending linearly in the second predetermined direction. In the second predetermined direction, the second section 240B of the present modification has a length slightly less than a length of the second section 240 of the aforementioned embodiment. The first feeding point 2421B is provided at an end portion of the second section 240B in the second predetermined direction.

As shown in FIG. 3, the second section 240B has a first segment 241 and a second segment 242B. The first segment 241 has a structure similar to that of the first segment 241 of the multi-resonant antenna 10 of the aforementioned embodiment. Accordingly, a detailed explanation thereabout is omitted.

As shown in FIG. 3, the second segment 242B extends from the first segment 241. Specifically, the second segment 242B extends linearly in the second predetermined direction from the first segment 241. In the second predetermined direction, a middle 245B of the second section 240B is positioned between the first segment 241 and the second segment 242B. Specifically, in the second predetermined direction, the middle 245B of the second section 240B is positioned on a boundary between the first segment 241 and the second segment 242B. The first feeding point 2421B is provided at an end portion of the second segment 242B in the second predetermined direction.

As shown in FIG. 3, the excitation source 40 is connected to the second feeding point 252B. Specifically, an outer conductor (not shown) of the coaxial cable is connected to the second feeding point 252B.

As shown in FIG. 3, the second feeding part 250B extends from the main portion 320 to the second feeding point 252B. More specifically, the second feeding part 250B extends linearly in the first predetermined direction from the main portion 320 and is bent so that it extends to the second feeding point 252B in the third predetermined direction. The second feeding part 250B is positioned in the first predetermined direction beyond a fourth portion 336.

As shown in FIG. 3, the additional radiation element 270B extends outward of the main antenna 30B directly from the feeding portion 210B. The additional radiation element 270B extends outward from the feeding portion 210B. The additional radiation element 270B extends in the first predetermined direction from the feeding portion 210B.

As shown in FIG. 3, the additional radiation element 270B extends from the second segment 242B including the first feeding point 2421B. Accordingly, the additional radiation element 270B extends from the vicinity of the first feeding point 2421B. This facilitates impedance matching of the additional radiation element 270B.

As shown in FIG. 3, the additional radiation element 270B has an additional linear portion 272B extending linearly in the second predetermined direction. The linear portion 2422B and the additional linear portion 272B are spaced apart from each other in the lateral direction. The linear portion 2422B and the additional linear portion 272B are parallel to each other. The linear portion 2422B and the additional linear portion 272B form an open slot 260B which is opened at its end. This further facilitates impedance matching of the additional radiation element 270B. The open slot 260B is opened at its end portion in the third predetermined direction.

As shown in FIG. 3, the additional radiation element 270B has a base portion 271B and a first extending portion 274. The first extending portion 274 has a structure similar to that of the first extending portion 274 of the multi-resonant antenna 10 of the aforementioned embodiment. Accordingly, a detailed explanation thereabout is omitted. The base portion 271B extends in the first predetermined direction from the second segment 242B. Specifically, the base portion 271B extends linearly in the first predetermined direction from the second segment 242B. The base portion 271B and the first extending portion 274 are coupled with each other by the additional linear portion 272B. The additional linear portion 272B extends in the third predetermined direction from the base portion 271B.

Although the additional radiation element 270B of the present modification has the base portion 271B, the additional linear portion 272B and the first extending portion 274, the present invention is not limited thereto. The additional radiation element 270B may be configured as follows: the additional radiation element 270B has none of the base portion 271B and the additional linear portion 272B; and the additional radiation element 270B consists only of the first extending portion 274 which extends directly from the second segment 242B.

The length and shape of the additional radiation element 270B are decided so that the additional radiation element 270B electrically resonates at a desired operating frequency. The desired operating frequency is different from an operating frequency of the main antenna 30B.

As understood from FIG. 3, the multi-resonant antenna 10B of the present modification also has a structure which can electrically resonate at the two operating frequencies, one of which is the operating frequency of the main antenna 30B, or a first resonance portion, and the other of which is the operating frequency of the additional radiation element 270B, or a second resonance portion.

(Third Modification)

Figure 4:
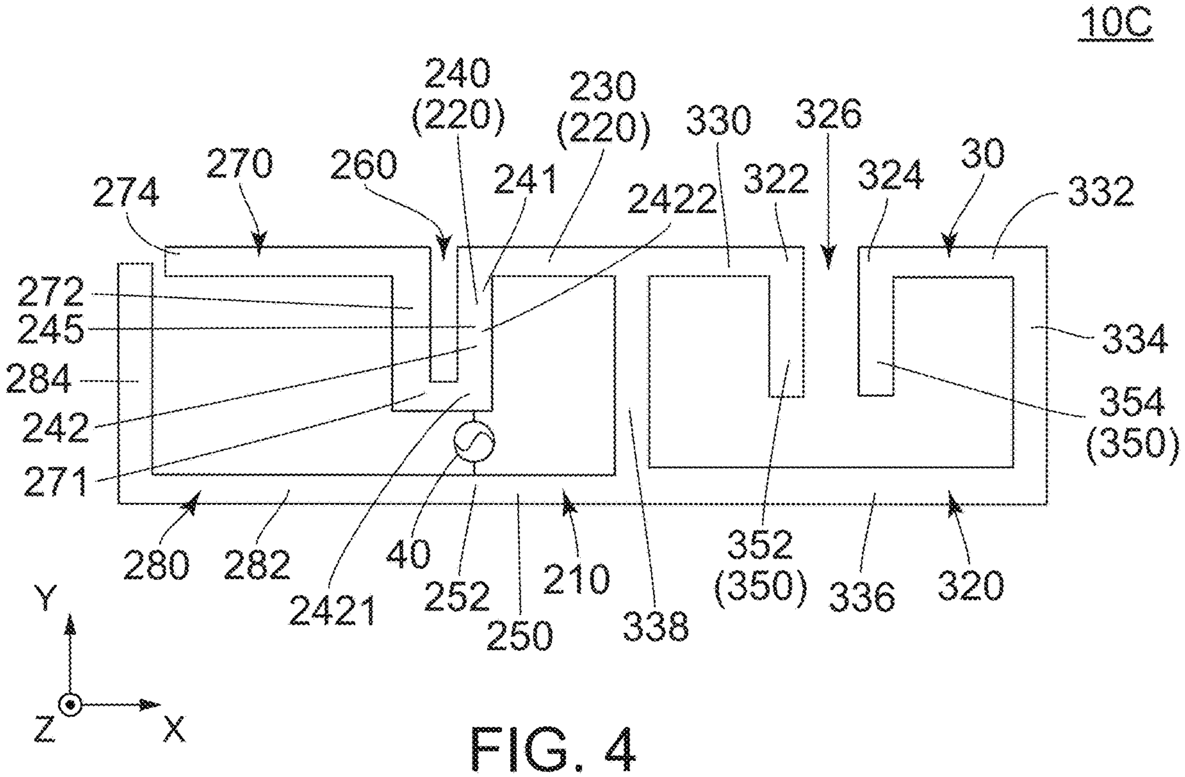
FIG. 4 is a top view showing a third modification of the multi-resonant antenna of FIG. 1.

As shown in FIG. 4, a multi-resonant antenna 10C of a third modification comprises a main antenna 30, an additional radiation element 270 and an auxiliary radiation element 280. The main antenna 30 and the additional radiation element 270 have structures same as those of the main antenna 30 and the additional radiation element 270 of the multi-resonant antenna 10 of the aforementioned embodiment. Accordingly, a detailed explanation thereabout is omitted. There is no ground conductor around the multi-resonant antenna 10C of the present modification.

As shown in FIG. 4, the main antenna 30, the additional radiation element 270 and the auxiliary radiation element 280 are positioned on a common plane perpendicular to the up-down direction. The multi-resonant antenna 10C is configured so that the main antenna 30, the additional radiation element 270 and the auxiliary radiation element 280 are integrally formed with each other. A combination of the main antenna 30, the additional radiation element 270 and the auxiliary radiation element 280 is formed of a conductive pattern formed on a substrate (not shown). However, the present invention is not limited thereto. Specifically, the combination of the main antenna 30, the additional radiation element 270 and the auxiliary radiation element 280 may be formed of, for example, a metal member which is mounted on a substrate when used.

As shown in FIG. 4, the auxiliary radiation element 280 extends outward of the main antenna 30 from the second feeding part 250. More specifically, the auxiliary radiation element 280 linearly extends outward of the main antenna 30 from the second feeding part 250 and is bent so that it extends in the third predetermined direction. The auxiliary radiation element 280 extends in the first predetermined direction from the second feeding part 250. The auxiliary radiation element 280 has a first linear portion 282 and a second linear portion 284.

As shown in FIG. 4, the first linear portion 282 extends linearly in the first predetermined direction from the second feeding part 250. The first linear portion 282 is positioned in the second predetermined direction beyond the additional radiation element 270. In other words, the additional radiation element 270 is positioned in the third predetermined direction beyond the first linear portion 282.

As shown in FIG. 4, the second linear portion 284 extends linearly in the third predetermined direction from the first linear portion 282. The second linear portion 284 is positioned in the first predetermined direction beyond the additional radiation element 270. It is noted that the second linear portion 284 is not coupled with the additional radiation element 270.

The length and shape of the auxiliary radiation element 280 are decided so that the auxiliary radiation element 280 electrically resonates at a desired operating frequency. The desired operating frequency is different from any of operating frequencies of the main antenna 30A and the additional radiation element 270.

As understood from FIG. 4, the auxiliary radiation element 280 operates as a third resonance portion different from any of a first resonance portion and a second resonance portion. The first resonance portion, the second resonance portion and the third resonance portion have resonance frequencies different from each other. Thus, the multi-resonant antenna 10C of the present modification has a structure which can electrically resonate at the three operating frequencies, one of which is the operating frequency of the main antenna 30, or the first resonance portion, another of which is the operating frequency of the additional radiation element 270, or the second resonance portion, and the other of which is the operating frequency of the auxiliary radiation element 280, or the third resonance portion.

(Fourth Modification)

Figure 5:
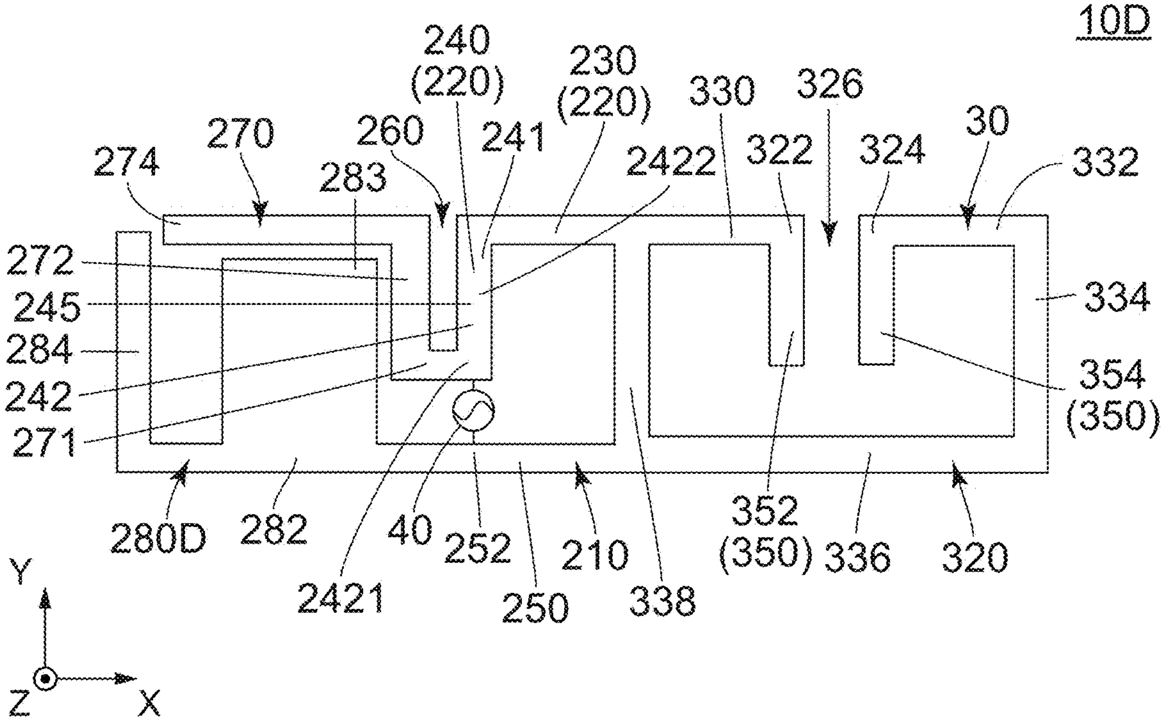
FIG. 5 is a top view showing a fourth modification of the multi-resonant antenna of FIG. 1.

As shown in FIG. 5, a multi-resonant antenna 10D of a fourth modification comprises a main antenna 30, an additional radiation element 270 and an auxiliary radiation element 280D. The main antenna 30 and the additional radiation element 270 have structures same as those of the main antenna 30 and the additional radiation element 270 of the multi-resonant antenna 10 of the aforementioned embodiment. Accordingly, a detailed explanation thereabout is omitted. There is no ground conductor around the multi-resonant antenna 10D of the present modification.

As shown in FIG. 5, the main antenna 30, the additional radiation element 270 and the auxiliary radiation element 280D are positioned on a common plane perpendicular to the up-down direction. The multi-resonant antenna 10D is configured so that the main antenna 30, the additional radiation element 270 and the auxiliary radiation element 280D are integrally formed with each other. A combination of the main antenna 30, the additional radiation element 270 and the auxiliary radiation element 280D is formed of a conductive pattern formed on a substrate (not shown). However, the present invention is not limited thereto. Specifically, the combination of the main antenna 30, the additional radiation element 270 and the auxiliary radiation element 280D may be formed of, for example, a metal member which is mounted on a substrate when used.

As shown in FIG. 5, the auxiliary radiation element 280D extends outward of the main antenna 30 from the second feeding part 250. The auxiliary radiation element 280D has a first linear portion 282, a wide portion 283 and a second linear portion 284. The first linear portion 282 and the second linear portion 284 have structures same as those of the first linear portion 282 and the second linear portion 284 of the auxiliary radiation element 280C of the multi-resonant antenna 10C of the third modification. Accordingly, a detailed explanation thereabout is omitted.

As shown in FIG. 5, the wide portion 283 extends in the third predetermined direction from the first linear portion 282. The wide portion 283 is positioned in the second predetermined direction beyond the additional radiation element 270. It is noted that the wide portion 283 is not coupled with the additional radiation element 270.

The length and shape of the auxiliary radiation element 280D are decided so that the auxiliary radiation element

280D electrically resonates at a desired operating frequency. The desired operating frequency is different from any of operating frequencies of the main antenna 30 and the additional radiation element 270.

As understood from FIG. 5, the auxiliary radiation element 280D operates as a third resonance portion different from any of a first resonance portion and a second resonance portion. The first resonance portion, the second resonance portion and the third resonance portion have resonance frequencies different from each other. Thus, the multi-resonant antenna 10D of the present modification has a structure which can electrically resonate at the three operating frequencies, one of which is the operating frequency of the main antenna 30, or the first resonance portion, another of which is the operating frequency of the additional radiation element 270, or the second resonance portion, and the other of which is the operating frequency of the auxiliary radiation element 280D, or the third resonance portion.

(Fifth Modification)

Figure 6:
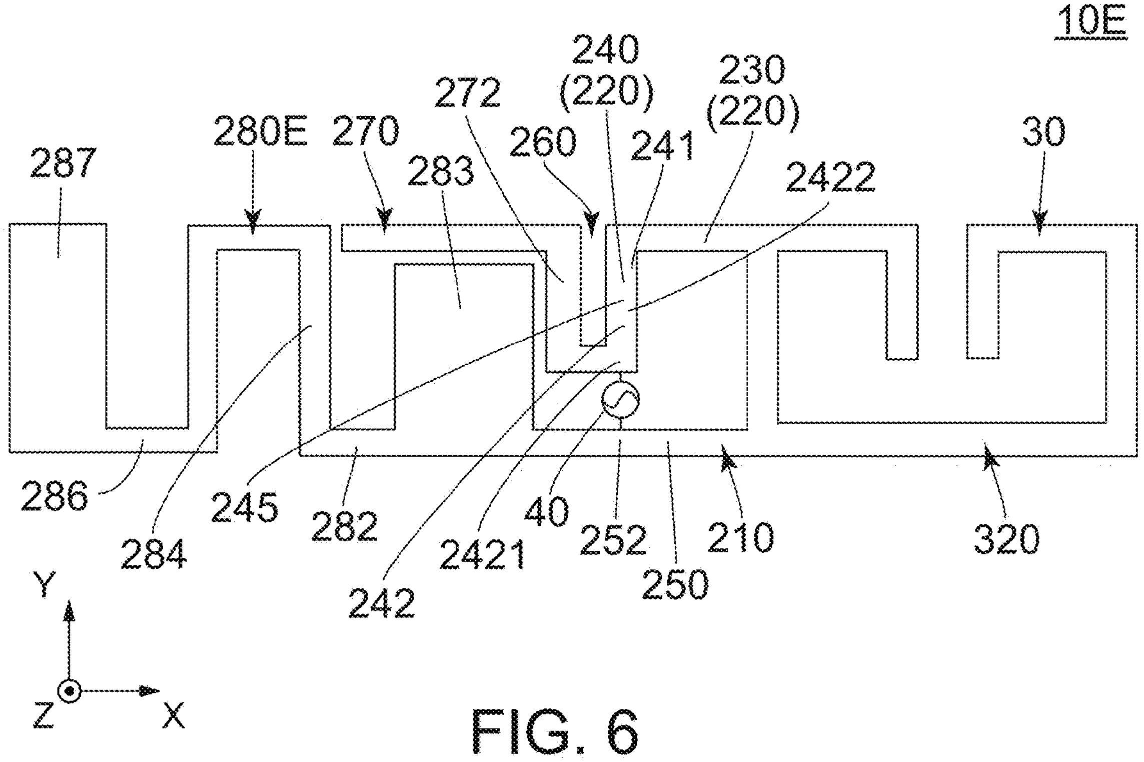
FIG. 6 is a top view showing a fifth modification of the multi-resonant antenna of FIG. 1.

As shown in FIG. 6, a multi-resonant antenna 10E of a fifth modification comprises a main antenna 30, an additional radiation element 270 and an auxiliary radiation element 280E. The main antenna 30 and the additional radiation element 270 have structures same as those of the main antenna 30 and the additional radiation element 270 of the multi-resonant antenna 10 of the aforementioned embodiment. Accordingly, a detailed explanation thereabout is omitted. There is no ground conductor around the multi-resonant antenna 10E of the present modification.

As shown in FIG. 6, the main antenna 30, the additional radiation element 270 and the auxiliary radiation element 280E are positioned on a common plane perpendicular to the up-down direction. The multi-resonant antenna 10E is configured so that the main antenna 30, the additional radiation element 270 and the auxiliary radiation element 280E are integrally formed with each other. A combination of the main antenna 30, the additional radiation element 270 and the auxiliary radiation element 280E is formed of a conductive pattern formed on a substrate (not shown). However, the present invention is not limited thereto. Specifically, the combination of the main antenna 30, the additional radiation element 270 and the auxiliary radiation element 280E may be formed of, for example, a metal member which is mounted on a substrate when used.

As shown in FIG. 6, the auxiliary radiation element 280E extends outward of the main antenna 30 from the second feeding part 250. The auxiliary radiation element 280E has a first linear portion 282, a wide portion 283, a second linear portion 284, a cranked portion 286 and an additional wide portion 287. The first linear portion 282, the wide portion 283 and the second linear portion 284 have structures same as those of the first linear portion 282, the wide portion 283 and the second linear portion 284 of the auxiliary radiation element 280D of the multi-resonant antenna 10D of the fourth modification. Accordingly, a detailed explanation thereabout is omitted.

As shown in FIG. 6, the cranked portion 286 extends in the first predetermined direction from the second linear portion 284. More specifically, the cranked portion 286 extends linearly in the first predetermined direction from the second linear portion 284, and is bent so that it extends linearly in the second predetermined direction, and is further bent so that it extends linearly in the first predetermined direction.

As shown in FIG. 6, the additional wide portion 287 extends in the third predetermined direction from the cranked portion 286.

The length and shape of the auxiliary radiation element 280E are decided so that the auxiliary radiation element 280E electrically resonates at a desired operating frequency. The desired operating frequency is different from any of operating frequencies of the main antenna 30 and the additional radiation element 270.

As understood from FIG. 6, the auxiliary radiation element 280E operates as a third resonance portion different from any of a first resonance portion and a second resonance portion. The first resonance portion, the second resonance portion and the third resonance portion have resonance frequencies different from each other. Thus, the multi-resonant antenna 10E of the present modification has a structure which can electrically resonate at the three operating frequencies, one of which is the operating frequency of the main antenna 30, or the first resonance portion, another of which is the operating frequency of the additional radiation element 270, or the second resonance portion, and the other of which is the operating frequency of the auxiliary radiation element 280E, or the third resonance portion.

(Sixth Modification)

Figure 7:
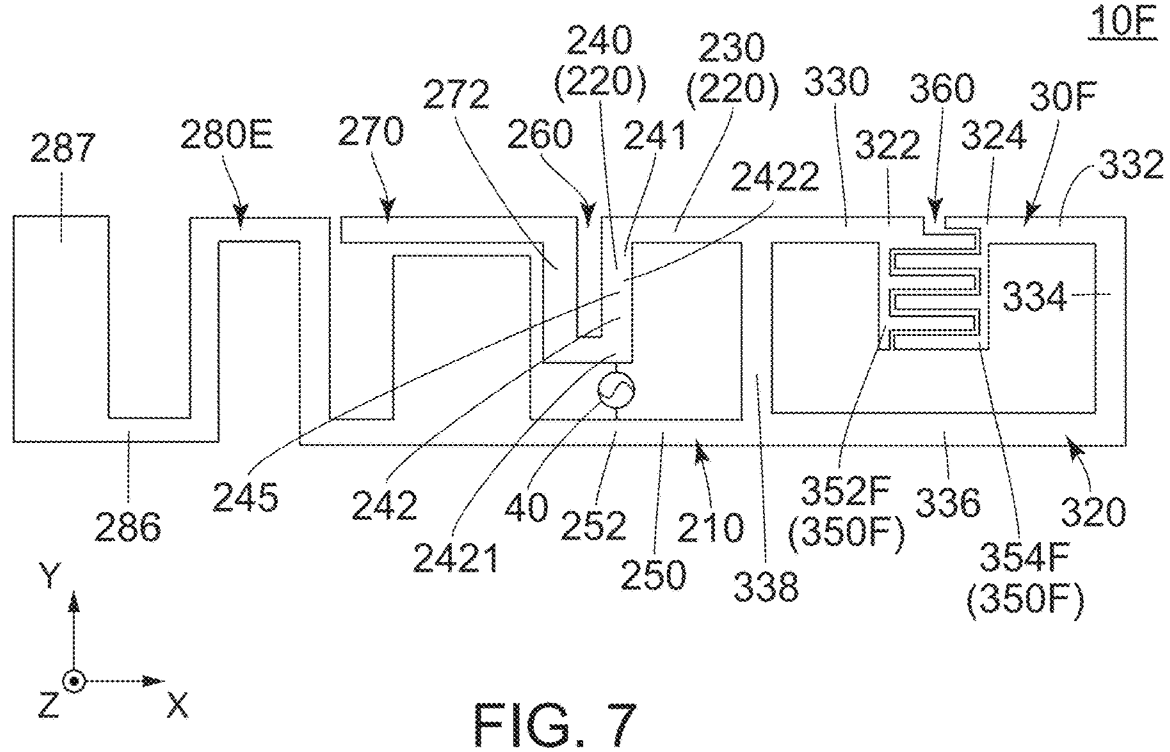
FIG. 7 is a top view showing a sixth modification of the multi-resonant antenna of FIG. 1.
Figure 8:
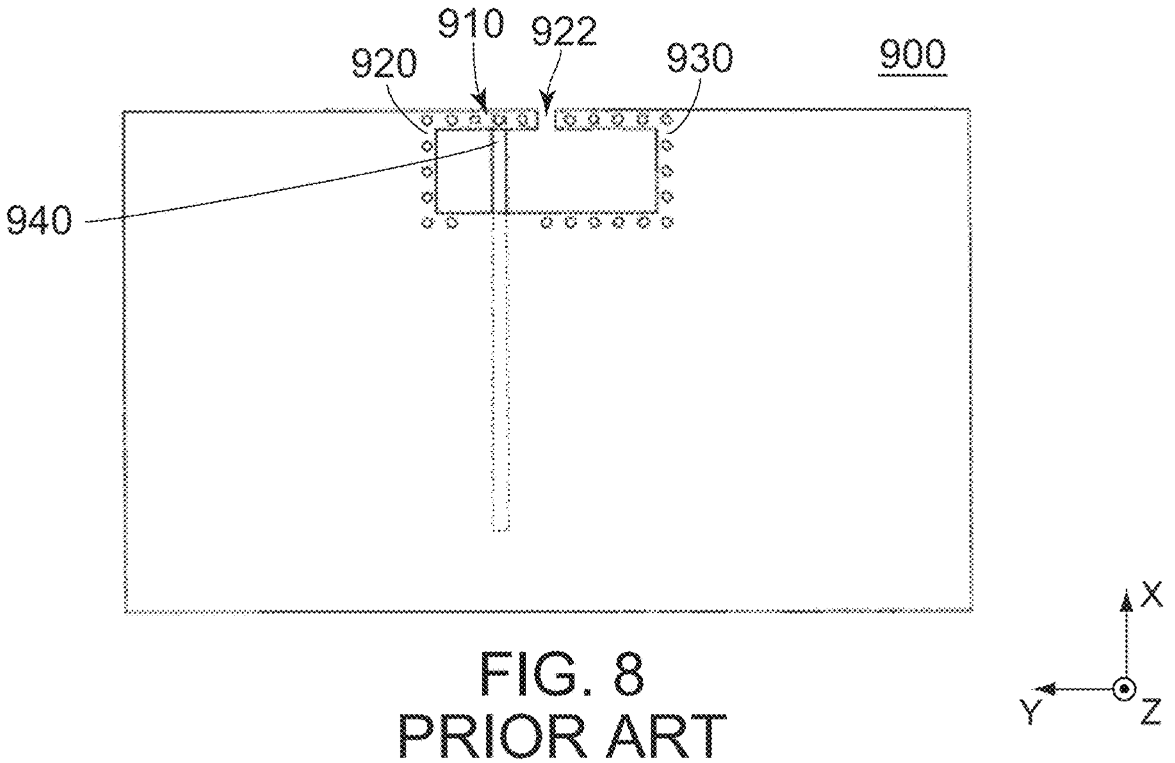
FIG. 8 PRIOR ART
FIG. 8 is a top view showing an antenna disclosed in Patent Document 1.

As shown in FIG. 7, a multi-resonant antenna 10F of a sixth modification comprises a main antenna 30F, an additional radiation element 270 and an auxiliary radiation element 280E. The additional radiation element 270 and the auxiliary radiation element 280E have structures same as those of the additional radiation element 270 and the auxiliary radiation element 280E of the multi-resonant antenna 10E of the fifth modification. Accordingly, a detailed explanation thereabout is omitted. There is no ground conductor around the multi-resonant antenna 10F of the present modification.

As shown in FIG. 7, the main antenna 30F, the additional radiation element 270 and the auxiliary radiation element 280E are positioned on a common plane perpendicular to the up-down direction. The multi-resonant antenna 10F is configured so that the main antenna 30F, the additional radiation element 270 and the auxiliary radiation element 280E are integrally formed with each other. A combination of the main antenna 30F, the additional radiation element 270 and the auxiliary radiation element 280E is formed of a conductive pattern formed on a substrate (not shown). However, the present invention is not limited thereto. Specifically, the combination of the main antenna 30F, the additional radiation element 270 and the auxiliary radiation element 280E may be formed of, for example, a metal member which is mounted on a substrate when used.

As shown in FIG. 7, the main antenna 30F comprises a main portion 320 and a feeding portion 210. The main portion 320 and the feeding portion 210 have structures same as those of the main portion 320 and the feeding portion 210 of the multi-resonant antenna 10 of the aforementioned embodiment. Accordingly, a detailed explanation thereabout is omitted.

As shown in FIG. 7, the main antenna 30F further comprises a facing portion 350F.

As shown in FIG. 7, the facing portion 350F has a first facing portion 352F and a second facing portion 354F. The first facing portion 352F extends from a first end portion 322 in the front-rear direction, while the second facing portion 354F extends from a second end portion 324 in the front-rear direction. Each of the first facing portion 352F and the second facing portion 354F extends inward of the main portion 320. Each of the first facing portion 352F and the second facing portion 354F has a comb shape. An interdigital slot 360 is formed between the first facing portion 352F and the second facing portion 354F.

Referring to FIG. 7, the main portion 320 forms an inductive component of the main antenna 30F because of the shape thereof. The first end portion 322 and the second end portion 324 form a capacitive component of the main antenna 30F together with the first facing portion 352F and the second facing portion 354F. With this structure, the main antenna 30F is operable as an LC resonance circuit, or a first resonance portion. The LC resonance circuit formed by the main antenna 30F is also called as a split ring resonator. Thus, the main antenna 30F forms the first resonance portion.

As understood from FIG. 7, the multi-resonant antenna 10F of the present modification has a structure which can electrically resonate at three operating frequencies, one of which is an operating frequency of the main antenna 30F, or the first resonance portion, another of which is an operating frequency of the additional radiation element 270, or a second resonance portion, and the other of which is an operating frequency of the auxiliary radiation element 280E, or a third resonance portion.

Although the specific explanation about the present invention is made above referring to the embodiments, the present invention is not limited thereto and is susceptible to various modifications and alternative forms.

Although there is no ground conductor around the multi-resonant antennas 10, 10A, 10B, 10C, 10D, 10E, 10F of the present embodiment and modifications, the present invention is not limited thereto. Specifically, a ground conductor may be provided at a location beyond the main antenna 30, 30A, 30B, 30F in the positive X-direction. Additionally, a ground conductor may be provided at a location beyond the main antenna 30, 30A, 30B, 30F in the negative Y-direction, or in the second predetermined direction. Furthermore, a ground conductor may be provided at a location beyond the auxiliary radiation element 280, 280D, 280E in the negative Y-direction, or in the second predetermined direction.

Although the multi-resonant antennas 10, 10A, 10B, 10C, 10D, 10E of the present embodiment and modifications are configured so that the first facing portion 352 and the second facing portion 354 extend linearly in the front-rear direction from the first end portion 322 and the second end portion 324, respectively, while the split portion 326 extends linearly in the second predetermined direction, the present invention is not limited thereto. Specifically, similar to the first facing portion 352F and the second facing portion 354F of the multi-resonant antenna 10F of the sixth modification, the multi-resonant antennas 10, 10A, 10B, 10C, 10D, 10E may be modified so that each of the first facing portion 352 and the second facing portion 354 has a comb shape while an interdigital slot is formed between the first facing portion 352 and the second facing portion 354.

Although the multi-resonant antennas 10C, 10D, 10E, 10F of the present modifications comprise the auxiliary radiation elements 280, 280D, 280E, the present invention is not limited thereto. Specifically, the multi-resonant antenna 10C, 10D, 10E, 10F may comprise no auxiliary radiation element 280, 280D, 280E.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. A multi-resonant antenna comprising a main antenna and an additional radiation element, wherein:

the main antenna comprises a main portion and a feeding portion;

the main portion forms a split ring;

the feeding portion extends outward of the main antenna from the main portion; and the additional radiation element extends outward of the main antenna directly from the feeding portion.

2. The multi-resonant antenna as recited in claim 1, wherein:

the feeding portion comprises a first feeding point, a first feeding part, a second feeding point and a second feeding part;

the first feeding part has a first section and a second section;

the first section extends in a first predetermined direction from the main portion;

the second section extends from the first section in a second predetermine direction intersecting with the first predetermined direction;

the second section has a first segment and a second segment;

the first segment extends from the first section;

the second segment extends from the first segment;

in the second predetermined direction, a middle of the second section is positioned between the first segment and the second segment;

the first feeding point is provided at an end portion of the second segment in the second predetermined direction;

the second feeding part extends from the main portion to the second feeding point; and the additional radiation element extends from the second segment.

3. The multi-resonant antenna as recited in claim 2, wherein:

the second section has a linear portion extending linearly in the second predetermined direction;

the additional radiation element has an additional linear portion extending linearly in the second predetermined direction;

the linear portion and the additional linear portion are parallel to each other; and the linear portion and the additional linear portion form an open slot which is opened at its end.

4. The multi-resonant antenna as recited in claim 2, wherein the multi-resonant antenna further comprises an auxiliary radiation element which extends outward of the main antenna from the second feeding part.

* * * * *